United States Patent
Krupnik

(10) Patent No.: US 10,453,333 B1
(45) Date of Patent: Oct. 22, 2019

(54) METHODS AND APPARATUS FOR LEVERAGING A MOBILE PHONE OR MOBILE COMPUTING DEVICE FOR USE IN CONTROLLING MODEL VEHICLES

(71) Applicant: Ari Krupnik, Sunnyvale, CA (US)

(72) Inventor: Ari Krupnik, Sunnyvale, CA (US)

(*) Notice: Subject to any disclaimer, the term of this patent is extended or adjusted under 35 U.S.C. 154(b) by 0 days.

(21) Appl. No.: 15/948,669

(22) Filed: Apr. 9, 2018

Related U.S. Application Data

(63) Continuation of application No. 15/446,810, filed on Mar. 1, 2017, now Pat. No. 9,965,948, which is a continuation of application No. 14/862,684, filed on Sep. 23, 2015, now Pat. No. 9,589,458, which is a continuation of application No. 14/065,775, filed on
(Continued)

(51) Int. Cl.
| | |
|---|---|
| *H04W 88/02* | (2009.01) |
| *G08C 17/02* | (2006.01) |
| *H04M 1/725* | (2006.01) |
| *A63H 27/00* | (2006.01) |
| *G06F 3/0482* | (2013.01) |
| *G06F 3/0488* | (2013.01) |
| *G10L 15/22* | (2006.01) |

(Continued)

(52) U.S. Cl.
CPC .............. *G08C 17/02* (2013.01); *A63H 27/02* (2013.01); *A63H 30/04* (2013.01); *G06F 3/0482* (2013.01); *G06F 3/04883* (2013.01); *G10L 15/22* (2013.01); *H04M 1/72533* (2013.01); *H04W 88/02* (2013.01); *G08C 2201/93* (2013.01); *G10L 2015/223* (2013.01); *H04N 7/183* (2013.01)

(58) Field of Classification Search
CPC ........ G06F 2203/04808; G06F 3/0482; G08G 1/0133
USPC ....... 455/550.1, 575.1, 90.1, 90.2, 90.3, 420
See application file for complete search history.

(56) References Cited

U.S. PATENT DOCUMENTS

| | | |
|---|---|---|
| 6,038,295 A | 3/2000 | Mattes |
| 6,315,667 B1 | 11/2001 | Steinhart |

(Continued)

FOREIGN PATENT DOCUMENTS

CA    2887596 A1    7/2015

OTHER PUBLICATIONS

"U.S. Appl. No. 13/181,723 , Response filed May 7, 2013 to Non Final Office Action dated Jan. 7, 2013", 16 pgs.
(Continued)

*Primary Examiner* — Sam Bhattacharya
(74) *Attorney, Agent, or Firm* — Schwegman Lundberg & Woessner, P.A.

(57) ABSTRACT

Methods and systems for utilizing a mobile computing device (e.g., such as a mobile phone) for use in controlling a model vehicle are described. Consistent with some embodiments, a mobile computing device provides various user controls for generating signals that are communicated to a radio transmitter device coupled with the mobile computing device, and ultimately broadcast to a receiver residing at a model vehicle. With some embodiments, the mobile computing device may be integrated with a controller housing which provides separate user controls, such that a combination of user controls present on the mobile computing device and the controller housing can be used to control a model vehicle.

20 Claims, 10 Drawing Sheets

Related U.S. Application Data

Oct. 29, 2013, now Pat. No. 9,144,748, which is a continuation of application No. 13/181,723, filed on Jul. 13, 2011, now Pat. No. 8,600,432.

(60) Provisional application No. 61/365,232, filed on Jul. 16, 2010.

(51) Int. Cl.
*A63H 30/04* (2006.01)
*H04N 7/18* (2006.01)

(56) References Cited

U.S. PATENT DOCUMENTS

| | | |
|---|---|---|
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,401,860 B1 * | 3/2013 | Evans .................... A63H 30/04 340/945 |
| 8,600,432 B2 | 12/2013 | Krupnik |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,144,748 B2 | 9/2015 | Krupnik |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,589,458 B2 | 3/2017 | Krupnik |
| 9,965,948 B2 | 5/2018 | Krupnik et al. |
| 2009/0256822 A1 | 10/2009 | Amireh et al. |
| 2011/0202598 A1 | 8/2011 | Evans et al. |
| 2012/0015686 A1 | 1/2012 | Krupnik |
| 2012/0209924 A1 | 8/2012 | Evans et al. |
| 2014/0057678 A1 | 2/2014 | Krupnik |
| 2016/0012719 A1 | 1/2016 | Krupnik et al. |
| 2017/0178495 A1 | 6/2017 | Krupnik |

OTHER PUBLICATIONS

"U.S. Appl. No. 13/181,723, Non Final Office Action dated Jan. 7, 2013", 8 pgs.

"U.S. Appl. No. 13/181,723, Notice of Allowance dated Aug. 2, 2013", 8 pgs.

"U.S. Appl. No. 14/065,775, Non Final Office Action dated Aug. 28, 2014", 5 pgs.

"U.S. Appl. No. 14/065,775, Notice of Allowance dated May 22, 2015", 7 pgs.

"U.S. Appl. No. 14/065,775, Response filed Mar. 2, 2015 to Non Final Office Action dated Aug. 28, 2014", 4 pgs.

"U.S. Appl. No. 14/862,684, Non Final Office Action dated Nov. 13, 2015", 4 pgs.

"U.S. Appl. No. 14/862,684, Notice of Allowance dated Oct. 24, 2016", 7 pgs.

"U.S. Appl. No. 14/862,684, Response filed May 13, 2016 to Non Final Office Action dated Nov. 11, 2015", 8 pgs.

"U.S. Appl. No. 15/446,810, Non Final Office Action dated May 5, 2017", 7 pgs.

"U.S. Appl. No. 15/446,810, Notice of Allowance dated Jan. 9, 2018", 7 pgs.

"U.S. Appl. No. 15/446,810, Response filed Sep. 18, 2017 to Non Final Office Action dated May 5, 2017", 10 pgs.

Leyden, John, "This SMS will self-destruct in 40 seconds", [Online]. Retrieved from the Internet: <URL: http://www.theregister.co.uk/2005/12/12/stealthtext/>, (Dec. 12, 2005), 1 pg.

* cited by examiner

METHODS AND APPARATUS FOR LEVERAGING A MOBILE PHONE OR MOBILE COMPUTING DEVICE FOR USE IN CONTROLLING MODEL VEHICLES

CLAIM OF PRIORITY

This application is a Continuation Application under 35 USC § 120 of U.S. patent application Ser. No. 15/446,810, entitled "Methods and Apparatus for Leveraging a Mobile Phone or Mobile Computing Device for Use in Controlling Model Vehicles," filed on Mar. 1, 2017, which is a Continuation Application under 35 USC § 120 of U.S. patent application Ser. No. 14/862,684, entitled "Methods and Apparatus for Leveraging a Mobile Phone a Mobile Phone or Mobile Computing Device for Use in Controlling Model Vehicles," filed on Sep. 23, 2015, which is a Continuation Application of U.S. patent application Ser. No. 14/065,775, filed on Oct. 29, 2013, entitled "Methods and Apparatus for Leveraging a Mobile Phone or Mobile Computing Device for Use in Controlling Model Vehicles," which is a Continuation Application of U.S. patent application Ser. No. 13/181,723, entitled, "Methods and Apparatus for Leveraging a Mobile Phone or Mobile Computing Device for Use in Controlling Model Vehicles," filed on Jul. 13, 2011, which claims the benefit of priority under 35 U.S.C. 119(e) to U.S. Provisional Patent Application Ser. No. 61/365,232, filed Jul. 16, 2010, all of which are incorporated herein by reference in their entireties.

TECHNICAL FIELD

The present disclosure generally relates to controller devices for use in controlling model vehicles (e.g., automobiles, airplanes, boats and helicopters) and other similar devices. More specifically, the present disclosure relates to methods and systems for utilizing a mobile phone or mobile computing device in combination with a radio transmitter device to control the operation of a model vehicle, or other radio-enabled device.

BACKGROUND

Radio-controlled (RC) model vehicles (e.g., automobiles, airplanes, boats and helicopters) and like-kind devices are available in a wide variety of forms, and at a wide variety of price points. While the vast majority of model vehicles are used purely for enjoyment by hobbyists, model vehicles are frequently used in a number of commercial endeavors as well, such as photography and filming, weather metering, and other experimental uses. Radio-controlled model vehicles use a common set of components for their control and operation. Typically, an operator utilizes a controller that is outfitted with a radio transmitter module to send a radio signal to a receiver that is built into the model vehicle. The receiver receives the radio signal broadcast and changes the radio signal into suitable electrical control signals for the other components of the control system, such as electronic speed controllers, servomechanisms (commonly shortened to, "servos"), or other control devices. Many controllers utilize radio systems that implement amplitude modulation (AM) for the radio signal and encode the control positions (e.g., for the servos or the electronic speed controllers) with pulse width modulation (PWM). However, more advanced radio systems are available that use the more robust frequency modulation (FM) and pulse code modulation (PCM). More recently, several digital radio frequency transmission schemes have been used with RC model vehicles. In particular, some systems have utilized spread spectrum frequency hopping technologies in the 2.4 GHz band. Of course, other encoding schemes might be used as well.

A conventional controller for operating a radio-controlled model vehicle has a number of user controls, such as joysticks, steering wheels, triggers, buttons, switches, and so forth, which enable the operator to steer and control the speed of a model vehicle, and in some instances, operate other mechanisms (e.g., landing gear, brakes, etc.) that are part of the model vehicle. As an operator manipulates the user controls, electronic circuitry senses the position of the user controls and generates appropriate electrical signals that are encoded for transmission with a radio signal by the radio transmitter device to the receiver built into the model vehicle. The receiver, in turn, receives the radio signal and generates the appropriate electrical signals for the various servos, and in some instances an electronic speed controller, which operate the steering and speed controls of the model vehicle. The type and complexity of the model vehicle dictates the number of user-controllable steering mechanisms (e.g., ailerons, rudder and elevator for an airplane) and other control mechanisms, and therefore the number of independent channels or signals that need to be encoded and transmitted with the radio signal.

More advanced controllers may include one or more processors or microcontrollers and a persistent, non-volatile storage device for storing software applications and/or configuration settings that enable an operator to configure his controller for use with any one of several different model vehicles, or for any one of several different operation modes for a single model vehicle. In addition, more advanced controllers may include a built-in display for displaying various items of information, including configuration settings for the controller and/or a selected model vehicle. For instance, an operator may utilize a single controller with several different model vehicles. Accordingly, the display may enable a menu system that enables the operator to select a particular configuration setting stored in memory and associated with a particular controller configuration for use with a particular model vehicle. By selecting a particular configuration setting, the controller can be customized for use with a particular model vehicle. For instance, the user controls may be configured to generate the appropriate electrical signals for controlling different control mechanisms (e.g., ailerons, rudder and elevator) on the selected model vehicle. In addition, the configuration settings may customize the controller to operate in a particular operating mode for the same model vehicle. For example, an operator may have separate configuration settings for certain operation modes for a model airplane, including separate configuration setting for take-offs, flying at altitude, and landings.

Although a single conventional controller may be utilized to operate multiple model vehicles, typically, the nature of the user controls for different types of model vehicles requires that different controllers be used for different types of model vehicles. For example, a controller for use in operating a model car may have a user control in the shape or form of a small steering wheel, allowing the operator to manipulate the steering of the model car by simply turning the steering wheel. However, a controller for use in operating an airplane or helicopter may have user controls in the form of joysticks. Consequently, an RC model enthusiast is likely to purchase multiple controllers, which generally adds to the overall cost associated with the enjoyment of owning and operating RC model vehicles. Additionally, due to the higher relative costs of controllers with more advanced features that are facilitated with processors, microcontrollers, memory and touch-screen displays, many RC model enthusiasts may opt for less expensive controllers that do not include many of the advanced features that are enabled with the more costly hardware components.

BRIEF DESCRIPTION OF THE DRAWINGS

Some embodiments are illustrated by way of example and not limitation in the figures of the accompanying drawings, in which.

DETAILED DESCRIPTION

Figure 1B:
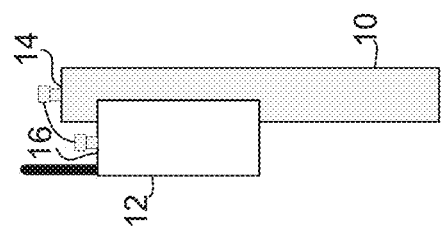
FIGS. 1A and 1B illustrate a front and side view respectively of a controller for a model vehicle, consistent with some embodiments of the invention.

Methods and systems for utilizing a mobile computing device (e.g., such as a mobile phone) for use in controlling a model vehicle are described. In the following description, for purposes of explanation, numerous specific details are set forth in order to provide a thorough understanding of the various aspects of different embodiments of the present invention. It will be evident, however, to one skilled in the art, that the present invention may be practiced without some of the specific details.

As used herein, a control component is a component or device on a model vehicle that receives an electrical signal from a receiver, and manipulates a control mechanism (e.g., ailerons, rudder and elevator for an airplane) enabling the operator of the model vehicle to assert control over the model vehicle. For instance, servos and electronic speed controllers are two different types of control components. For purposes of the present disclosure, a control mechanism is any component or device that is electrically and/or physically manipulated to operate the model vehicle. Control mechanisms on a model vehicle may include, but are certainly not limited to: engines, motors, steering arms, ailerons, rudders, elevators, rotors, landing gear, cameras, and so forth. As will be recognized by skilled artisans, in many instances, the boundary between a control component and control mechanism will be blurred, as a single component or device may serve to receive the electrical signal and physically manipulate some aspect of the model vehicle. As such, in some instances, a control component will encompass the control mechanism.

For purposes of the present disclosure, a user control is a sensor, device or component that is part of a controller, and enables an operator to control some aspect of the model vehicle by physically manipulating, or otherwise activating the user control. Consistent with various embodiments of the invention and depending in part on a selected operating mode of a controller, the user controls may be provided exclusively by a mobile computing device, exclusively by a controller housing into which the mobile computing device is integrated, or some combination of a controller housing and a mobile computing device. Examples of user controls include, but are not limited to: touch screen displays, accelerometers, gyroscopes, microphones, joysticks, steering wheels, toggle switches, buttons and triggers.

As will be described in greater detail below in connection with the description of the various figures, consistent with some embodiments of the invention, the user controls used in operating a model vehicle are provided exclusively by the mobile computing device (e.g., mobile phone). For example, an operator may control a model vehicle by touching a touch screen display of the mobile computing device and physically manipulating the mobile computing device to generate appropriate control signals via the mobile computing device's accelerometer, or gyroscope. Consistent with other embodiments, the user controls may be provided by a separate controller housing into which the mobile computing device is integrated. Accordingly, an operator may control the model vehicle by manipulating one or more joysticks, and one or more toggle switches that are components of the controller housing into which the mobile computing device is integrated. With other embodiments, or in other operating modes, an operator may use a combination of user controls provided by the mobile computing device (e.g., the touch screen display, accelerometer, or gyroscope) and user controls provided as part of the controller housing (e.g., joysticks, steering wheels, switches).

For purposes of the present disclosure, the term "mobile computing device" is meant to include mobile phones (frequently referred to as smartphones) as well as other general purpose or application specific computing devices that may lack the phone functionality, such as portable media players, cameras, and global positioning system (GPS) devices. Skilled artisans will immediately recognize that certain mobile computing devices, such as iPhones and iPod Touch devices developed by and available from Apple Corporation of Cupertino, Calif., as well as any one of a wide variety of devices based on the Android™ operating system developed by Google, Inc. of Mountain View, Calif., fall within the intended definition of a mobile computing device. A great number of other mobile computing devices, with other operating systems, will also be applicable to the inventive subject matter, which is described at length below in connection with the description of the various figures.

Figure 1A:
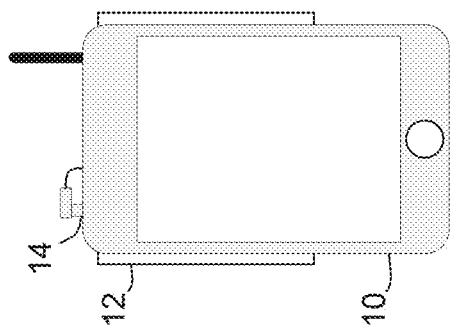

FIGS. 1A and 1B illustrate a front and side view, respectively, of a controller for a model vehicle consistent with some embodiments of the invention. As illustrated in FIGS. 1A and 1B, a mobile computing device 10, such as a mobile phone, is shown coupled with a radio transmitter device 12 for use as a controller for controlling a radio-enabled model vehicle. In the example illustrated in FIGS. 1A and 1B, the mobile computing device shown is representative of a mobile phone, or smartphone, and is communicatively coupled with the radio transmitter device 12 via an audio interface. The combination of the mobile computing device 10 and radio transmitter device 12 comprise what is referred to herein simply as a "controller."

An operator utilizes the controller (e.g., the combined mobile computing device 10 and radio transmitter device 12) by manipulating the mobile computing device 10 and its various user controls to operate a radio-enabled model vehicle. In some embodiments, a software application residing and executing on the mobile computing device receives input from, or otherwise detects the manipulation of, the various user controls and sensing components of the mobile computing device 10. In turn, the software application utilizes the received input from the user controls and sensing components to generate an appropriate electrical signal that is communicated to the radio transmitter device for broadcast to a receiver present in the model vehicle. The receiver then generates the appropriate electrical signals for the various control components (e.g., servos, electronic speed sensors, and so forth) to manipulate various control mechanisms for the model vehicle, such as ailerons, a rudder or elevator for a model airplane, or the rotors on a model helicopter.

Consistent with some embodiments, the mobile computing device has various user controls and sensing components for use in operating or controlling the model vehicle. For example, in some embodiments, the mobile computing device includes a touch screen display capable of detecting the presence and location of a touch within the display area of the screen.

Accordingly, an operator may press his finger in different locations on the touch screen to manipulate one of the control components (e.g., electronic speed controller, servo, etc.) on the model vehicle, thereby controlling the speed, or direction of the model vehicle. Additionally, in some embodiments, the mobile computing device 10 includes an accelerometer and/or gyroscope for detecting acceleration and orientation. Accordingly, by moving the controller and manipulating its orientation, an operator can control one or more aspects or functions of the model vehicle, such as the speed or direction of the model vehicle.

As shown in FIGS. 1A and 1B, the mobile computing device 10 is coupled to the wireless transmitter device 12 via each device's respective audio port 14 and 16. Accordingly, the electrical signal generated by the software application is directed to the wireless transmitter device 12 via a cable or wire connecting the wireless transmitter device 12 to the mobile computing device through the device's respective audio ports 14 and 16. In other embodiments, other types of hardware communications interfaces may be utilized to communicate the appropriate electrical signal from the mobile computing device 10 to the wireless transmitter device 12. In some instances, the hardware communications interface coupling the mobile computing device 10 to the wireless transmitter device 12 will have a wired connection, while in other embodiments, a wireless connection may be utilized. For instance, some examples of hardware communications interfaces that might be utilized to communicatively couple the wireless transmitter device 12 with the mobile computing device 10 include, but are not limited to: an audio port, a serial port, a Universal Serial Bus (USB) port, and/or a Bluetooth® port.

In some embodiments, the wireless transmitter device 12 may be comprised of separate components (not shown), including an industry standard wireless transmitter module that is housed in a separate housing specifically shaped to affix with or attach to a particular mobile computing device. Accordingly, the combined housing and wireless transmitter module form a wireless transmitter device 12. As such, various wireless transmitter modules with different features (e.g., radio frequency and signal encoding support) may be inserted into the housing of the wireless transmitter device 12 to facilitate control and operation of receivers that support different features, such as different radio frequencies or signal encoding algorithms.

Skilled artisans will recognize that the wireless transmitter device 12 shown in FIGS. 1A and 1B is provided as an example, and that the shape and size of the wireless transmitter device may vary significantly without departing from the overall spirit of the invention. Furthermore, any number of fastening mechanisms may be utilized to physically couple the wireless transmitter device to the mobile computing device. For instance, in some embodiments, the hardware communications interface may provide a fastening mechanism for attaching the wireless transmitter device 12 to the mobile computing device 10. In other embodiments, the wireless transmitting device 12 may be shaped such that it can be slid over the mobile computing device, or otherwise attached to the mobile computing device. In some embodiments, such as those in which the mobile computing device communicates with the wireless transmitter device via a wireless communication protocol, the wireless transmitter device may not necessarily be physically attached to the mobile computing device, but instead may be located in close proximity during operation.

Figure 2:
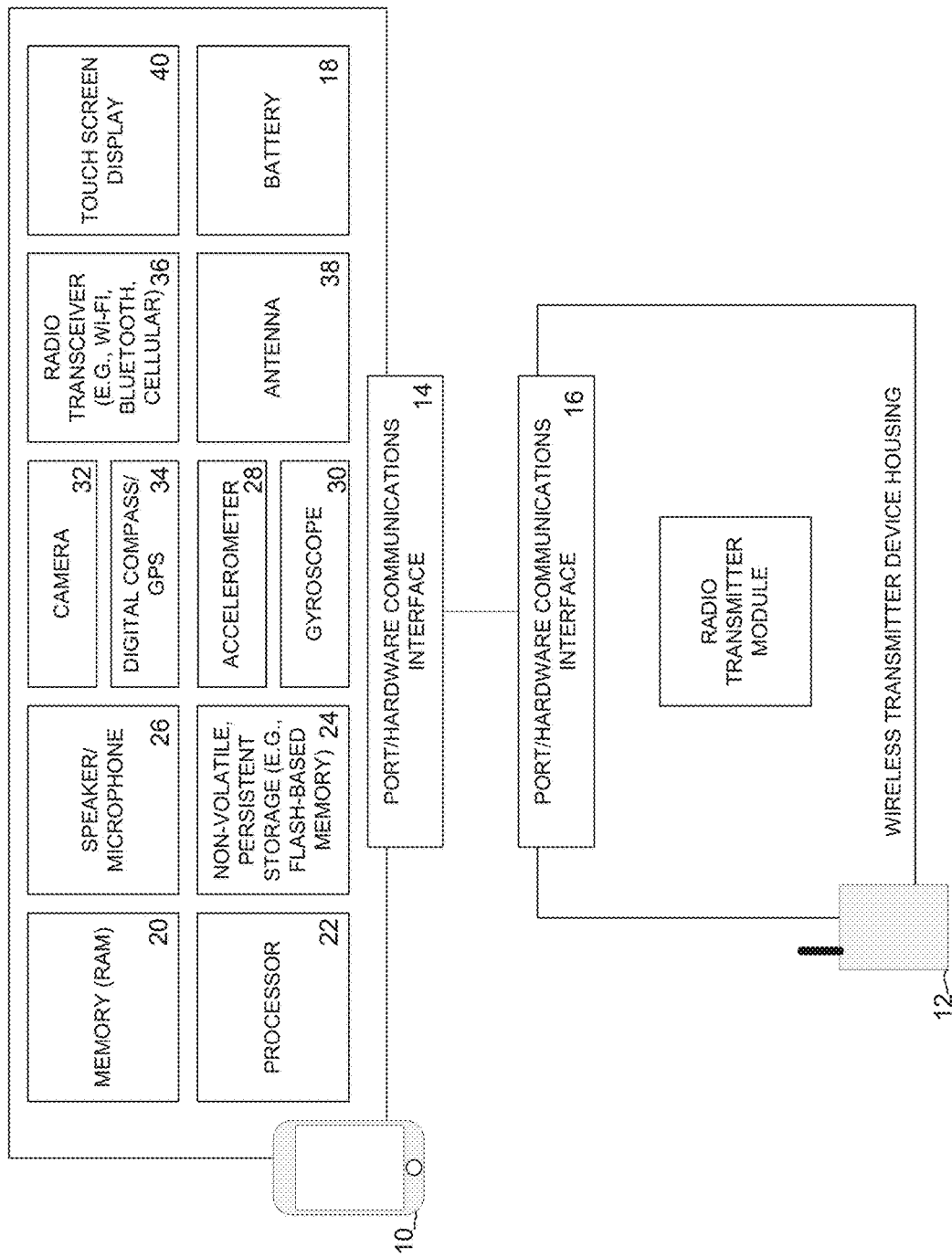
FIG. 2 is a functional block diagram of the various functional components or modules included in a controller for a model vehicle, consistent with some embodiments of the invention.

FIG. 2 is a functional block diagram of the various functional components or modules included in a controller for a model vehicle, consistent with some embodiments of the invention. As illustrated in FIG. 2, the mobile computing device 10 includes a battery 18 for powering the device 10 and its various components. In addition, the mobile computing device 10 includes a memory module (e.g., RAM) 20 and a processor 22 for executing an operating system (not shown) and various software applications. In particular, the processor 22 and memory 20 are used to execute a software application that detects the manipulation of the user controls of the mobile device 10, and in turn, generates and outputs the appropriate control signals that are broadcast via the wireless transmitter module for controlling a model vehicle. In some embodiments, the software application will utilize one or more application programming interfaces (API's) supported by the mobile device's operating system. In addition, the mobile computing device 10 of FIG. 2 includes a non-volatile, persistent storage module 24, such as a flash-based memory drive for storing software applications, configuration settings for user controls, and other digital content.

Consistent with some embodiments, the mobile computing device 10 includes one or more components for use as user controls in controlling or operating a model vehicle. In some embodiments, the software application for controlling a model vehicle will integrate with the various user controls via one or more APIs supported by the operating system of the mobile computing device 10. For example, as illustrated in FIG. 2, the mobile computing device 10 includes a speaker and microphone 26. An operator may direct verbally spoken commands to the microphone, which, upon being received and processed, result in the communication of a control signal to the model vehicle, such that a certain function or feature enabled by a control mechanism of the model vehicle is activated. Similarly, the speaker may play recorded audio clips to inform the operator of various events or activities associated with the operation of the model vehicle. The mobile computing device also includes an accelerometer 28 and a gyroscope 30. Using the accelerometer 28 and/or the gyroscope 30, a user can generate a control signal for operating the model vehicle by simply manipulating the position and orientation of the controller. In addition, the mobile computing device includes a touch screen display 40 for displaying information and controls, and sensing the position of an operator's touch on the display screen. Accordingly, an operator may control one or more control mechanisms by simply touching various positions of the touch screen display.

In some embodiments, the mobile computing device 10 includes a camera 32 and a digital compass and GPS module 34. Accordingly, the camera 32 may be used to capture one or more pictures of a model vehicle. The pictures can be associated with a particular software application, or a particular configuration setting, such that the captured picture can be displayed along with other information about the model vehicle. For instance, in some embodiments, when selecting a particular operation mode for the controller, or when selecting a particular configuration setting or software application for use with a particular model vehicle, several pictures of various model vehicles may be displayed, allowing the operator to select the appropriate application or configuration settings for a model vehicle by simply selecting the appropriate picture corresponding to the desired model vehicle. As will be described in greater detail below, the digital compass and GPS module 34 may be used to generate both orientation and position information that can be captured and stored in association with a particular operating session (e.g., flight, drive, or race). As such, the controller can be used to capture and share information about the various activities of the operator. In some embodiments, the software application that enables control of the model vehicle may include a social services module that can be used to share information via an online portal for RC enthusiasts. For example, using the social services module, an operator may automatically communicate messages via one or more messaging services or protocols (e.g., text messages, emails, tweets via Twitter, etc.) directly to other RC enthusiasts, or to a third party social networking service (e.g., Facebook), or to a proprietary online social service or portal directed to RC enthusiasts.

Consistent with some embodiments, the mobile computing device 10 includes one or more radio transceiver modules 36 and one or more antennas 38 for sending and receiving wireless data communications. For example the radio transceiver module 36 may facilitate voice and/or data communications over a wireless telephone network, a wireless data network (e.g., Wi-Fi®), or a Bluetooth® network. Accordingly, the social services module of the software application may communicate data via a data network supported by the radio transceiver module 36 and antenna 38.

As illustrated in FIGS. 1A, 1B and 2, the wireless transmitter device 12 is communicatively coupled to the mobile computing device 10 by means of each device's hardware communications interface 14 and 16. The hardware communications interfaces 14 and 16 may be any of a number of types, and may support any number of data communication protocols, including but not being limited to: an audio port/interface, a serial port, a USB port, or a Bluetooth port. For instance, in some embodiments, the various control signals generated by the software application are encoded and output via the audio port to the wireless transmitter device 12, which, upon receiving the encoded signals, generates the appropriate radio signal and broadcasts the signal to the receiver residing in the model vehicle.

While the controller of FIG. 2—and in particular the mobile computing device 10—is provided as an example to convey an understanding of the inventive subject matter, it will be appreciated that alternative embodiments may include a subset of the various components illustrated in FIG. 2 without departing from the spirit of the invention. In particular, many mobile computing devices (e.g., such as portable media players) may be applicable to the inventive subject matter, but may not include the necessary hardware components to facilitate voice and data communications over a wireless telephone network, and as such may not properly be identified as mobile phones.

Figure 3:
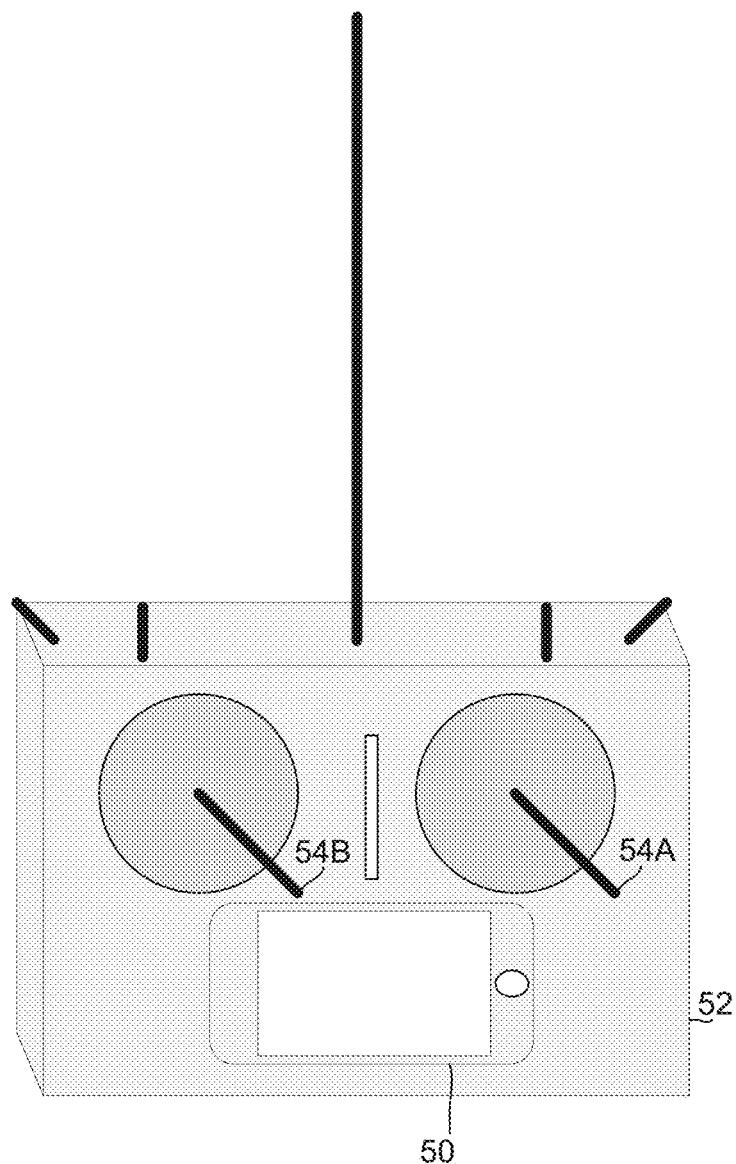
FIGS. 3 and 4 are perspective views of two controllers for a model vehicle, consistent with some embodiments of the invention.
Figure 4:
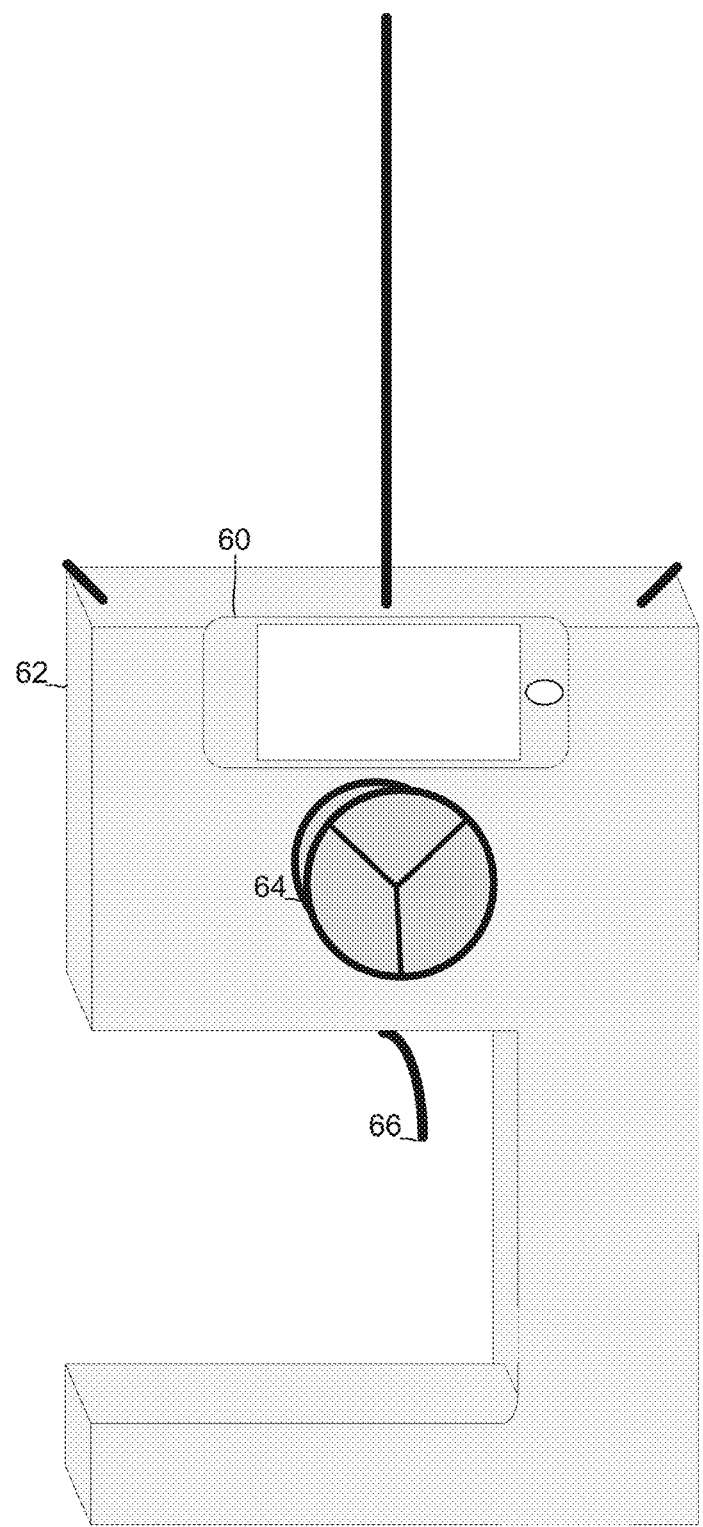

FIGS. 3 and 4 are perspective views of two different controllers for operating a model vehicle, consistent with some embodiments of the invention. In particular, FIG. 3 illustrates a mobile computing device 50 integrated with a controller housing 52 that has a pair of joysticks 54A and 54B and several toggle switches—typical of a controller for operating an RC model airplane or helicopter. FIG. 4 illustrates a mobile computing device 60 integrated with a controller housing 62 with a steering wheel 64 and a throttle trigger 66, such shape and form being typical of a controller for operating an RC model car, truck or boat. In contrast to the controller illustrated in FIGS. 1A and 1B, the controllers illustrated in FIGS. 3 and 4 generally comprise a mobile computing device coupled with a controller housing that has separate user controls, such that an operator can operate or control a model vehicle by manipulating a combination of user controls (e.g., joysticks, switches, steering wheel, and so forth) that are part of the controller housing and separate user controls and sensing components that are part of the mobile computing device (e.g., touch screen, accelerometer, gyroscope, GPS, and so forth). The combination of the controller housing and the integrated mobile computing device are referred to herein as a "controller." Skilled artisans will recognize and appreciate that the controllers illustrated in FIGS. 3 and 4 are provided to convey a general understanding of the inventive subject matter, and that the inventive subject matter is applicable to controllers that may have different combinations of user controls and various shapes and forms that differ from those specifically shown in FIGS. 3 and 4.

In FIGS. 3 and 4, the respective controller housings 52 and 62 are shown to include integrated mobile computing devices 50 and 60. In some embodiments, the controller housings 52 and 62 are shaped to include a recessed slot or opening into which a mobile computing device can be inserted. In some embodiments, inserting or otherwise attaching the mobile computing device will engage the hardware communications interface of the respective devices, such that the mobile computing device is enabled to communicate data with the controller housing. The mobile computing devices 50 and 60 can be inserted and removed from the controller housings 52 and 62 at the operator's will, and the mobile computing devices 50 and 60 can operate independently of the controller housings 52 and 62. Accordingly, for purposes of the present disclosure, the term "integrated" refers to the state of the mobile computing device when it is inserted into or otherwise coupled with its respective controller housing to enhance the functionality of the controller housing. In some embodiments, the controller housings 52 and 62 may have separate and distinct operation modes, such that each controller housing 52 and 62 can operate with or without an integrated mobile computing device 50 and 60. For example, with a mobile computing device, the controller housings may operate in an advanced or enhanced operational mode that provides advanced functionality that is not available when the controller housing is operated in a second operational mode, without the mobile computing device.

Consistent with some embodiments, the mobile computing device may store in its persistent, non-volatile memory, a vast number of different software applications and/or configuration settings for use with different model vehicles or different operating modes for the same model vehicle. For example, in some instances, the various software programs or configuration settings stored in the memory of the mobile computing device, when executed or implemented, configure or otherwise condition the various user controls of the controller housing and the user controls and sensing components of the mobile computing device for use with a particular model vehicle, or, a particular operating mode of a model vehicle. When coupled with the controller housing, the touch screen display of the mobile computing device serves as an input and display mechanism for receiving user input and displaying information related to the operation of the controller. Such information may include, for example, configuration information for any one of the available user controls on the controller housing, or the user controls or sensing components that are part of the mobile computing device. By utilizing the touch screen display of the mobile computing device as an input and output mechanism for various controller housings, the resulting controllers are enhanced with significantly greater computing power, additional user controls and a rich graphical user interface for use in configuring and operating the controller, without the added expense of having separate processors, touch screen displays and user controls in each controller housing with which the mobile computing device is compatible.

Figure 5:
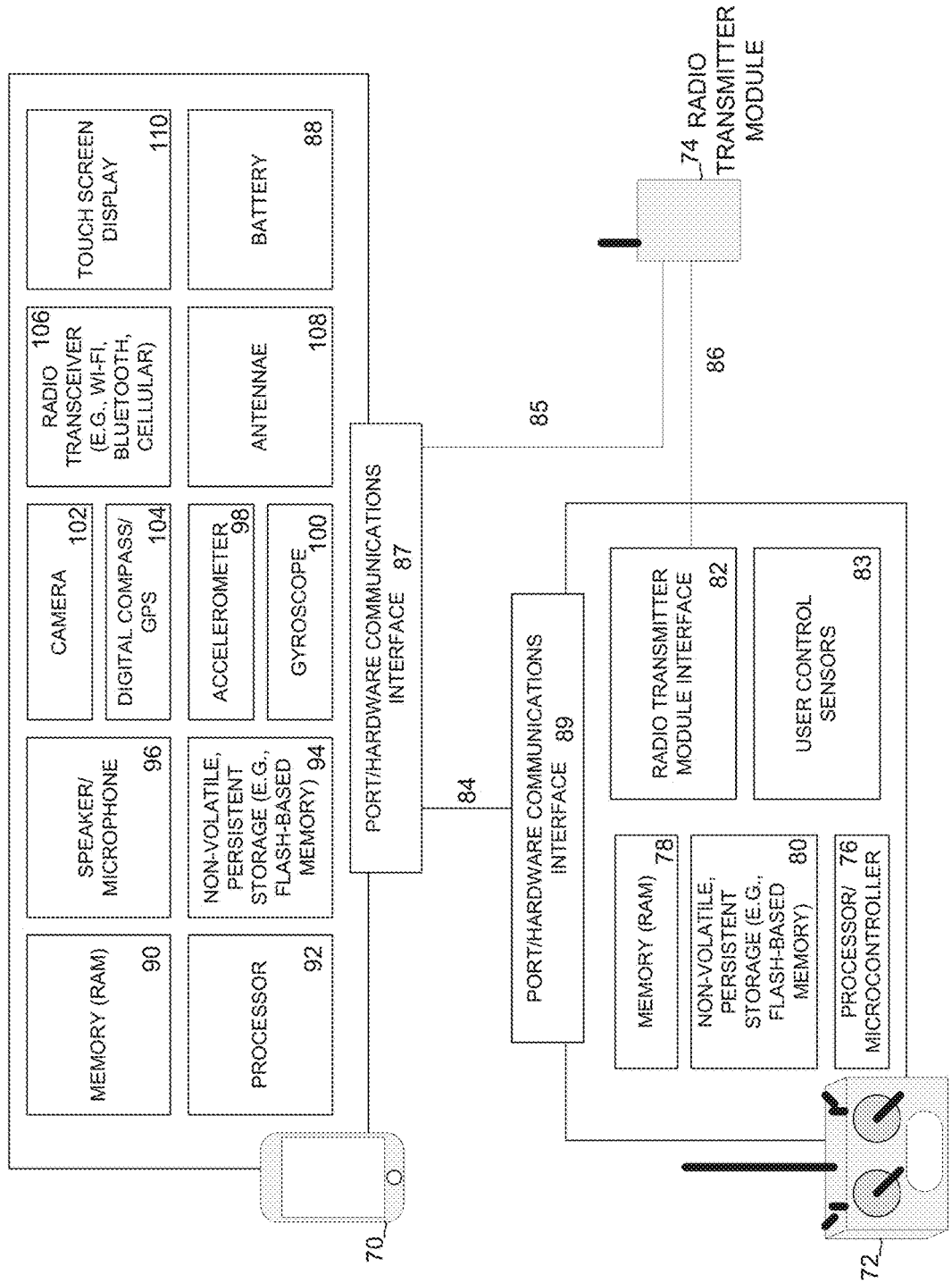
FIG. 5 is a functional block diagram of the various functional components or modules included in a controller for a model vehicle, consistent with some embodiments of the invention.

FIG. 5 is a functional block diagram of the various functional components or modules included in a controller for a model vehicle, consistent with some embodiments of the invention. In general, the functional block diagram illustrated in FIG. 5 is consistent with the controllers shown in FIGS. 3 and 4. As illustrated in FIG. 5, the controller includes a mobile computing device 70, a controller housing 72 and a radio transmitter module 74. In some embodiments, the radio transmitter module 74 and mobile computing device 70 are inserted into, or otherwise coupled with, the controller housing 72. For example, the mobile computing device 70 may be communicatively coupled with the controller housing 72 via each device's respective hardware communications interface 87 and 89. The hardware communications interfaces 87 and 89 may be any of a number of types, and may support any number of data communication protocols, including but not being limited to: an audio port/interface, a serial port, a USB port, or a Bluetooth port. The radio transmitter module 74 may be a conventional, industry standard radio transmitter module, such that different modules may be inserted into the controller housing 74 (e.g., via the radio transmitter module interface 82) to enable the operation of different model vehicles, for example, with receivers supporting different radio frequencies or different signal encoding algorithms. Alternatively, in some embodiments, the radio transmitter module may be built into the controller housing 72.

The controller housing 72 illustrated in FIG. 5 is shown to include a processor 76 and memory (e.g., RAM) 78 for executing software applications that may be stored in the controller housing's non-volatile, persistent storage 80, and/or for executing applications stored in the non-volatile, persistent storage 94 of the mobile computing device 70. In addition, the controller housing 72 is shown to include user control sensors 84 for sensing the operator's manipulation of the user controls, and for generating the appropriate electrical signals based on the manipulation of the user controls. In some embodiments, as indicated by the line with reference number 84, the electrical signals generated by the user control sensors 84 are first routed to the mobile computing device 70, where they may be processed before being communicated to the radio transmitter module 74, which broadcasts the signal to the receiver of a model vehicle. However, in alternative embodiments and as indicated by the line with reference number 86, the electrical signals generated by the user control sensors 84 are communicated directly to the radio transmitter module 74 via the radio transmitter module interface 82, without first being routed to the mobile computing device 70. In either case, the electrical signals generated by the user control sensors 84 of the controller housing 72 may be combined with one or more signals generated from a user control residing at the mobile computing device 70. For instance, the touch screen display 110, accelerometer 98 or gyroscope 100 of the mobile computing device 70 may be used in conjunction with one or more user controls of the controller housing 72 to control various functions of a model vehicle.

In general, the mobile computing device 70 illustrated in FIG. 5 includes all of the same components present in the mobile computing device 10 illustrated in FIG. 2. Specifically, the mobile computing device includes a battery for powering the device and its various components, including the processor 92 and memory 90 for executing applications stored in non-volatile, persistent storage 94. The mobile computing device 70 has a speaker and microphone 96, an accelerometer 98, a gyroscope 100, a camera 102, a digital compass/GPS module 104, and a touch screen display 110—all of which can be used as user controls for controlling various functions of a model vehicle. The mobile computing device includes a radio transceiver 106 and antenna 108 for communicating voice or data over a telephone or data network.

Figure 6:
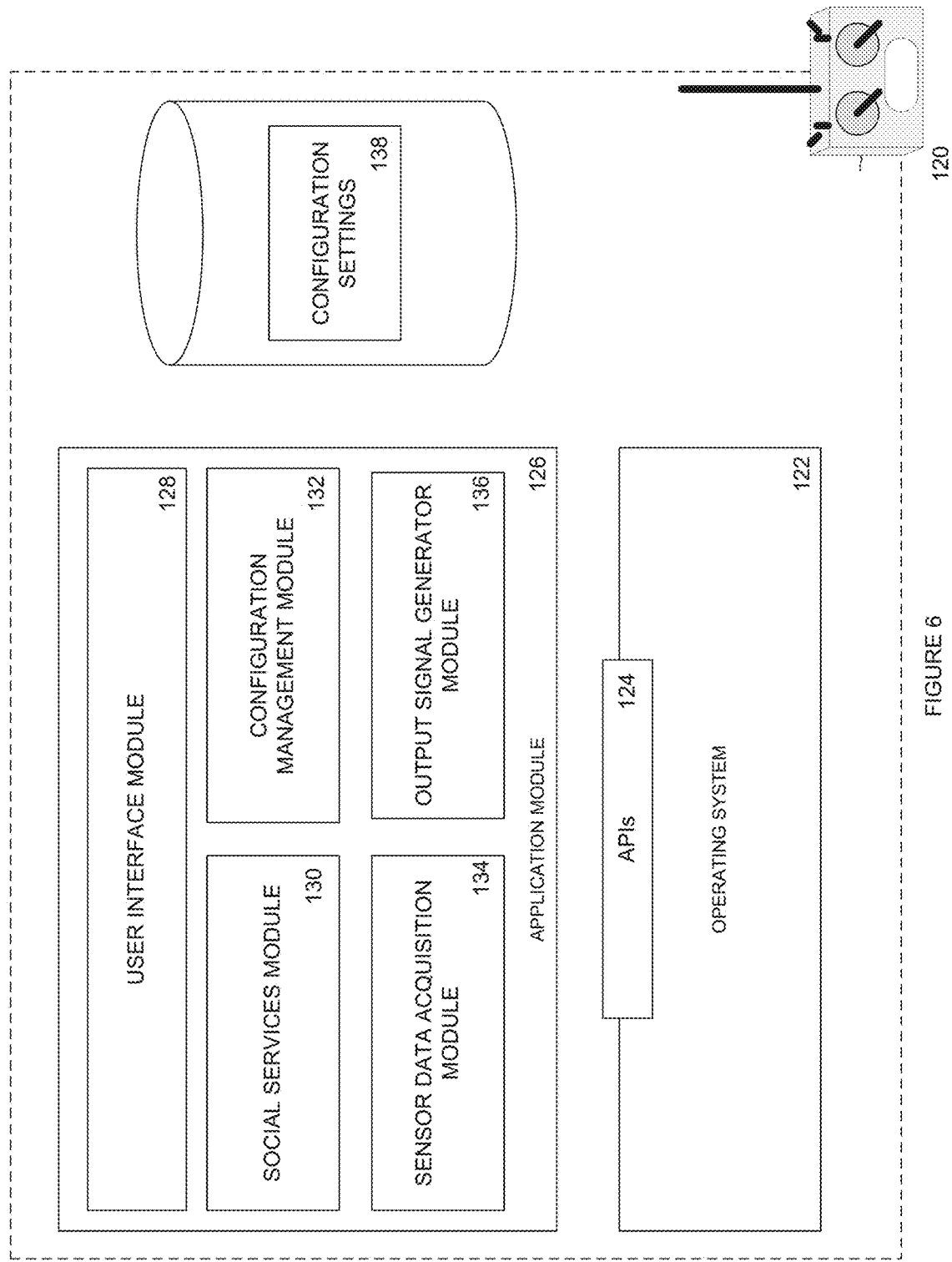
FIG. 6 is a functional block diagram of the various modules comprising an application for use in controlling a model vehicle, according to an embodiment of the invention.

Consistent with some embodiments, the mobile computing device 70 shown in FIG. 6 stores a large number of configuration settings that can be used with any number of model vehicles. By utilizing the persistent storage of the mobile computing device to store the configuration settings, the configuration settings can easily be applied to different controllers. Moreover, in some embodiments, an operator may share his or her configuration settings for a particular model vehicle with another person. For example, the software application for controlling the model vehicle may facilitate the sharing of configuration settings via any number of communication mechanisms, to include email and/or direct file transfers.

The touch screen display of the mobile computing device can be used to finely tune the various user controls of both the mobile computing device and the controller housing. For instance, a graphical user interface may display a representation of one or more user controls along with a user-modifiable graphical control that, when manipulated, can alter the exact nature of the control signal generated by a particular user control when the user control is manipulated. Similarly, by manipulating the configuration settings associated with a particular control, an operator may alter how a particular user control operates a particular control mechanism. For instance, a configuration setting may determine whether an aileron should go up or down when a joystick is pushed in a particular direction. Skilled artisans will recognize the vast number of variations and manipulations of the user controls that might be controlled via the graphical user interface, and corresponding configuration settings, displayed on a touch screen display of a mobile computing device integrated with a controller housing.

FIG. 6 is a functional block diagram showing an alternative view of various modules comprising a controller 120, implemented at least in part with software instructions, and for use in operating a model vehicle. As illustrated in FIG. 6, the controller 120 includes an operating system 122 that supports one or more APIs 124, and at least one application module 126 for use in controlling a model vehicle. The application module 126 is further comprised of a user interface module 128, a social services module 130, a configuration management module 132, a sensor data acquisition module 134, and an output signal generator module 136.

Figure 7:
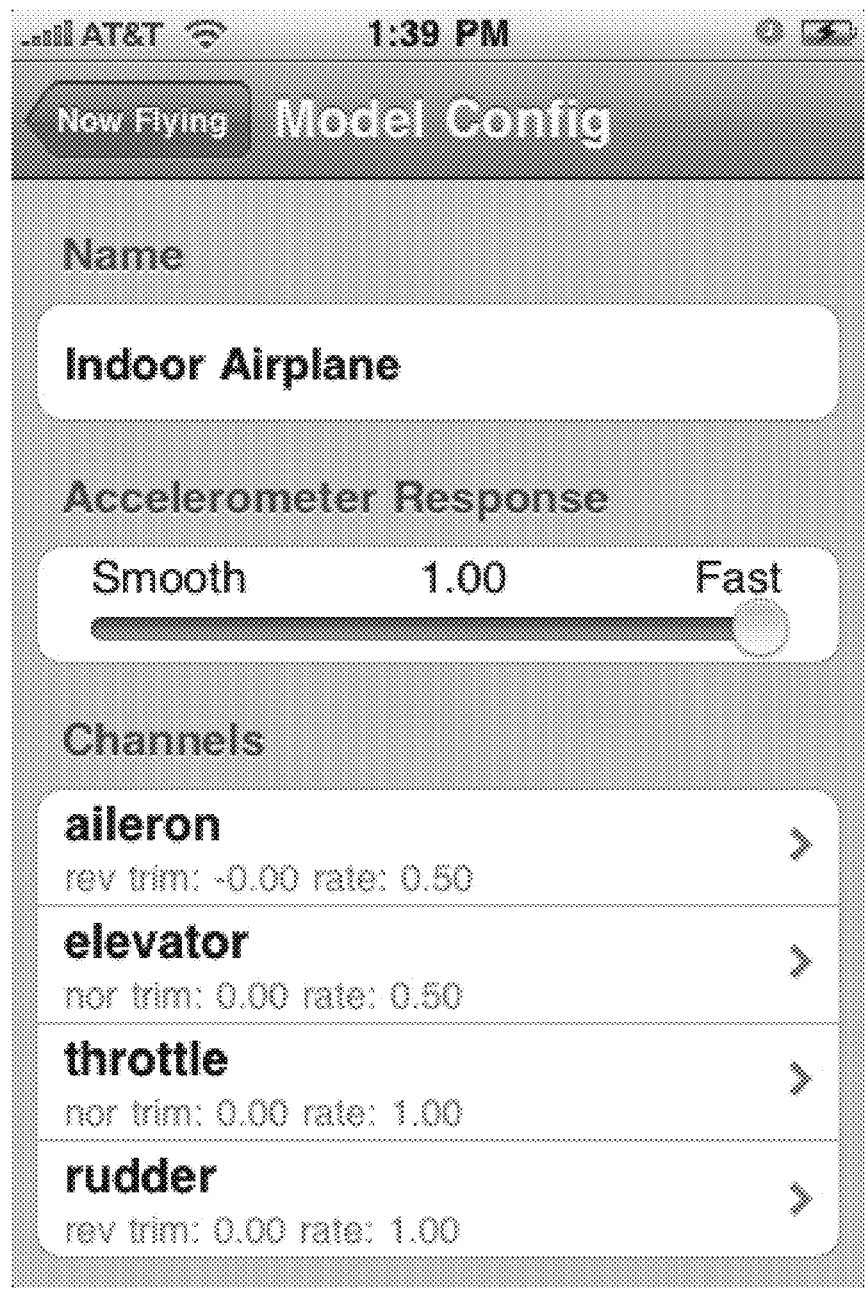
FIGS. 7, 8 and 9 illustrate examples of user interfaces for display on a mobile computing device, such as a mobile phone, for use in configuring the controller and/or controlling a model vehicle, according to some embodiments of the invention.
Figure 8:
Figure 9:
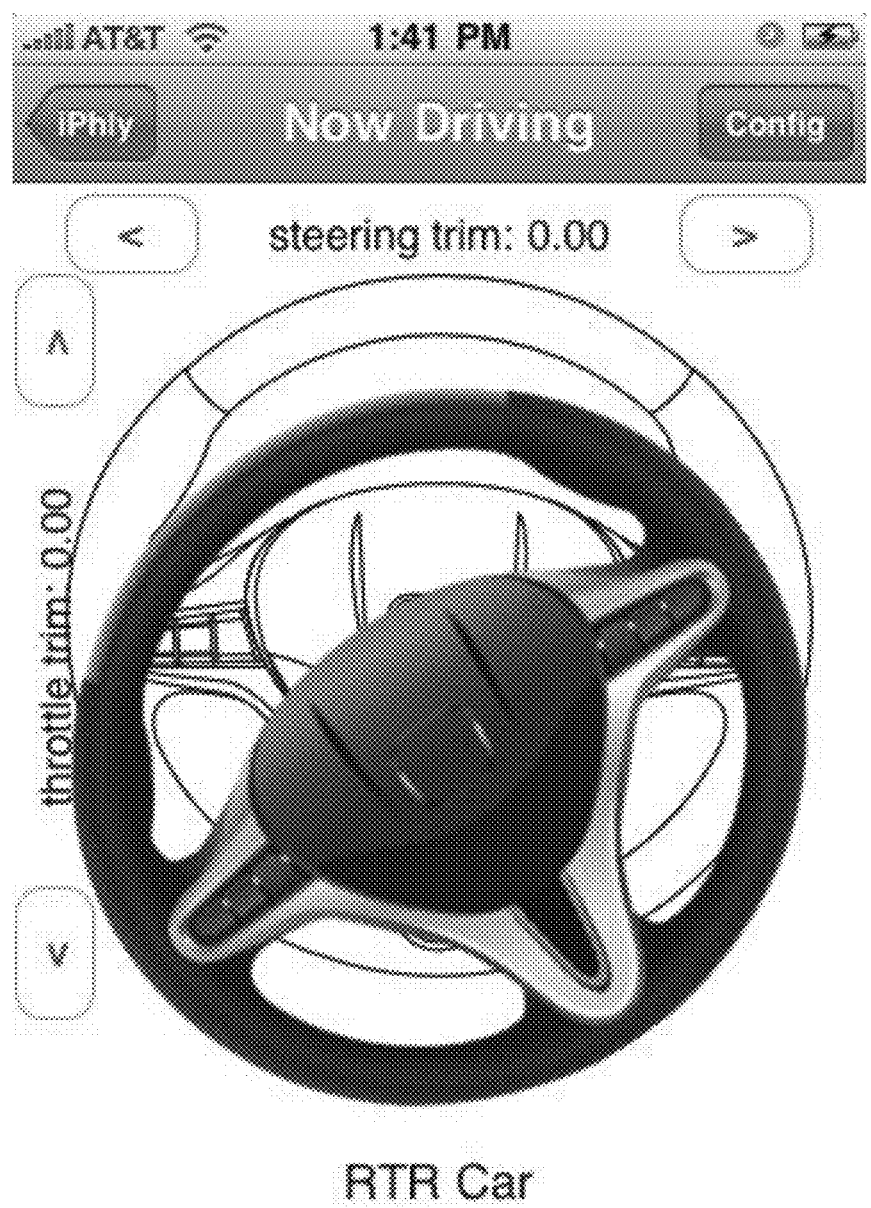
Figure 10:
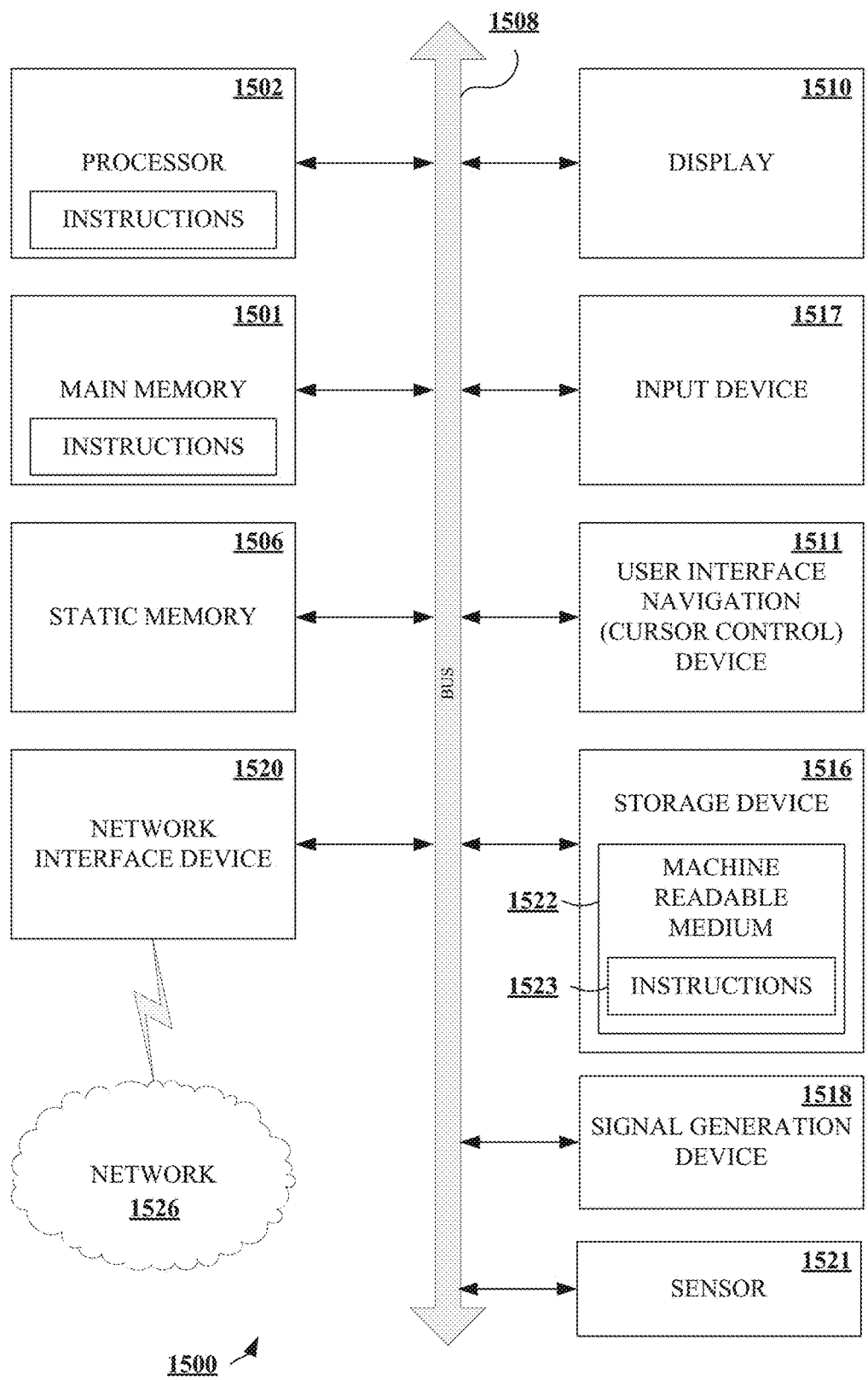
FIG. 10 is a block diagram of a machine in the form of a computer within which a set of instructions, for causing the machine to perform some of the methodologies discussed herein, may be executed.

Consistent with some embodiments, the user interface module 128, in conjunction with various elements of the operating system 122, facilitates the presentation of various interfaces of a graphical user interface. More specifically, the user interface module 128 facilitates the presentation of one or more interfaces that enable the configuration of one or more settings for various user controls present on a controller housing or integrated mobile computing device. Additionally, the user interface module facilitates the presentation of one or more interfaces used in the operation of one or more model vehicles. Examples of such interfaces are shown in FIGS. 7, 8 and 9, and described in connection with those figures.

The configuration management module 132, in conjunction with the user interface module 128, receives the various configuration settings 138 for different user controls, and stores the configuration settings in a data store, such as a separate file, a table of a database, or some other data structure. In some embodiments, the configuration settings for the various user controls are stored in association with a particular model vehicle. Accordingly, an operator may specify a first set of configuration settings for a first set of user controls, and store the configuration settings for use with a particular model vehicle. The operator may specify a second set of configuration settings for a second set of user controls, and store the second set of configuration settings for use with a different model vehicle. The number of model vehicles for which the application can store configuration settings is limited only by the size of the persistent storage in the mobile computing device. Moreover, the specified configuration settings and user controls may be specified on a per-controller housing basis, such that the operator may have different configuration settings for use with two different controller housings, but for the same model vehicle. In addition to facilitating the selection and specification of different configuration settings for different user controls, for use with various model vehicles, the configuration management module 132 also enables an operator to select a previously established set of configuration settings for use in operating a model vehicle. When a particular set of configuration settings is selected, the processor executes a set of instructions that specify how each respective user control is to generate an output signal based on an operator's manipulation of the user control. In this way, the various user controls can be altered to precisely operate the various control mechanisms of a model vehicle, just as the operator desires.

Consistent with some embodiments of the invention, the sensor data acquisition module 134 acquires the data signals from the various sensors of the user controls. For example, depending on the particular operational mode of the application module 126 and which user controls are active in operating a particular control mechanism of the model vehicle, the sensor data acquisition module 134 will continuously acquire data from the one or more active sensors associated with a user control, whether it be a user control on the mobile computing device (e.g., the touch screen display, accelerometer, or gyroscope), or a user control on a controller housing. In some embodiments, the data is acquired by the data acquisition module 134 via an API request associated with a particular active sensor. For instance, there may be a specific API call for acquiring data from the accelerometer, or the gyroscope. Similarly, an API call may be made to acquire data received from a user control that is part of the controller housing.

In some embodiments, this data that is acquired by the sensor data acquisition module 134 is manipulated by the output signal generator module 136 before it is communicated to a wireless transmitter module and broadcast to a receiver present in a model vehicle. For instance, in some embodiments, one or more configuration settings will determine how data acquired from the sensor of a particular user control is to be manipulated prior to the data being communicated to the wireless transmitter module for encoding and broadcast over a radio signal. In some embodiments, communicating the acquired and manipulated data to the wireless transmitter module is achieved via an API call.

FIGS. 7, 8 and 9 illustrate examples of user interfaces for display on a mobile computing device, such as a mobile phone, for use in configuring a controller and/or controlling a model vehicle, according to some embodiments of the invention. As illustrated in FIG. 7, a user interface for enabling the configuration of a model airplane is shown. The user interface includes a data field for entering the name of a model vehicle. In addition, the user interface shows several data fields that facilitate the provisioning of several configuration settings, for example, such as the accelerometer response, and the trim levels for the ailerons, elevator, throttle and rudder.

FIG. 8 illustrates an example user interface for operating a model vehicle, according to an embodiment of the invention. In particular, the user interface shown in FIG. 8 includes an attitude indicator for use in indicating what are commonly referred to as pitch (fore and aft tilt) and bank or roll (side-to-side tilt). In some embodiments, the attitude indicator conveys visual information concerning how the user controls are being manipulated by the operator. For instance, if the particular user control that affects the bank or roll of the model vehicle is being manipulated to cause a model vehicle to roll to the left or right, the display on the attitude indicator will correspond with what is being sensed by the user control that affects roll or bank. With some embodiments, such as that illustrated in FIGS. 1A, 1B and 2, an operator may control a model vehicle by simply tilting a controller forward, backward, or from side-to-side. With such an embodiment, the touch screen display may be used to control the speed of the model vehicle. An accelerometer or gyroscope in the mobile computing device detects the manipulation of the controller, and an appropriate electrical signal is both communicated to the model vehicle and used as an input to generate a visual display via the attitude indicator as illustrated in FIG. 8.

In some embodiments, the attitude indicator displayed in the user interface of FIG. 8 may convey information received from a sensing device (e.g., a gyroscope) present in the model vehicle. For example, instead of displaying information concerning how the controller is being manipulated, the attitude indicator may convey information about the actual orientation, with respect to the horizon, of the model vehicle. Accordingly, at least in some embodiments the visual indicator enables the operator to determine the actual orientation of a model vehicle when the model vehicle may be difficult to see because it is far away, behind an obstacle, or in the same general direction as a very bright light source such as the sun.

As illustrated in FIG. 8, the user interface includes trim controls (e.g., aileron trim, elevator trim and rudder trim) for configuring trim levels for ailerons, elevator and rudder. These software based trim controls perform the same general function as their physical counterparts on some conventional controllers. However, consistent with some embodiments, the trim controls manipulate how an electronic digital signal is generated.

Finally, FIG. 9 illustrates a user interface for controlling a model car or truck. Consistent with the interface shown in FIG. 9, an operator controls the model car by manipulating the orientation of the controller to turn the steering mechanism of the model car. Consequently, as the controller is rotated to the left, the steering wheel displayed in the user interface is shown turned to the left to convey that the accelerometer or gyroscope is detecting a leftward rotation, and thus generating a signal directing the steering control mechanism to turn the model vehicle to the left. The throttle in this example is controlled by swiping a finger across the touch screen display. For instance, by swiping a finger from the back to the front of the display, the throttle of the model vehicle can be increased. Similarly, swiping in the opposite direction, front to back, will result in decreasing the throttle output.

Skilled artisans will recognize that the user interfaces illustrated in FIGS. 7, 8 and 9 are examples only and are shown to convey a general understanding of the invention. In practice, user interfaces may vary significantly from what is shown in FIGS. 7, 8 and 9, and still be within the intended scope of the present inventive subject matter.

With some embodiments of the invention, the mobile computing device can be used to convey a wide variety of other information as well. For example, in some embodiments, one or more sensing components within the model vehicle may communicate information to the controller for display on the touch screen display of the mobile computing device, or to be conveyed with a vibrating device, or via the speaker of the mobile computing device. For instance, consistent with some of the general principles of telemetry applications, numerical measurement data captured from a sensing component within the model vehicle may be wirelessly communicated over a low bandwidth connection to the controller for display on the touch screen display. Such information may include, but is certainly not limited to: a battery level, a fuel level, motor RPMs (revolutions per minute), radio signal strength indication (RSSI), attitude, altitude, airspeed, compass orientation, GPS position reports, and so forth. In conventional controllers, telemetric information may be displayed, if at all, as raw numbers via low resolution bitmap LCD (liquid crystal display) screens, or with rudimentary annunciators, for example, like buzzers. However, with embodiments of the invention, such information can be conveyed in a variety of ways, including via a rich graphical user interface on the touch screen display of the integrated mobile computing device, or via the mobile computing device's vibrating device or speaker. In some embodiments, a software application executing on the mobile computing device can be used to process information received from a gyroscope or accelerometer within the model vehicle, and to generate an appropriate signal to effectuate the moving of a weight within the controller housing to give the operator the feeling of the directional tilt of the model vehicle. Similarly, with some embodiments, the controller may receive information from the model vehicle indicating the amount of current being drawn by a servo. This information can be used as an input to a software application, which can generate the appropriate electrical signal to drive a force feedback mechanism for a user control, such as a joystick, giving the operator a realistic feeling as if the operator was present within the model vehicle.

In addition to displaying telemetric information, in some embodiments, the mobile computing device may receive pictures or a video signal, in real-time, from a camera or video capturing device within the model. Accordingly, the touch screen display may display pictures or video captured by the camera of video capturing device in real time. Moreover, in some embodiments, a picture or video signal received at the controller (e.g., at the mobile computing device) from the model vehicle can be relayed to another computing device. For instance, in some instances, the pictures and/or video signals captured by the model vehicle may be communicated to the controller and then over a wireless connection (e.g., WiFi or cellular network connection) to an online portal for RC enthusiasts, another person's mobile computing device, or some other third party web site. In this way, the pictures and/or video captured by a model vehicle can be shared with others in real time.

Consistent with some embodiments of the invention, an online portal for RC enthusiasts facilitates a variety of social services including the exchange of information between RC enthusiasts. For example, in some embodiments, the software application that facilitates the operation of a model vehicle also serves as an interface to an online portal for RC enthusiasts. The portal may facilitate a wide variety of services including an information exchange. For example, an operator may be able to automatically post to the portal information about his current activities that are automatically ascertained by the application. For example, if an operator is presently operating a particular model vehicle, detailed information about the operation of the model vehicle, including the location of the flight (ascertained, for example with the GPS) may be posted for others to view. Additionally, an operator may be able to post his or her favorite configuration settings for a particular controller housing and/or model vehicle, such that others can download and experiment with the configuration settings.

The various operations of example methods and processes described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods and processes described herein may be at least partially processor-implemented. For example, at least some of the operations of a method may be performed by one or more processors or processor-implemented modules. The performance of certain of the operations may be distributed among the one or more processors, not only residing within a single machine, but in some instanced deployed across a number of machines. In some example embodiments, the processor or processors may be located in a single location, while in other embodiments the processors may be distributed across a number of locations.

With respect to certain aspects of the inventive subject matter—particularly the online social services portal—the one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

FIG. 9 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   storing, on a client device, model vehicle instructions received from a server, each of the model vehicle instructions associated with a control command of a model vehicle;
   receiving, on the client device, a verbal command detected by a microphone;
   determining that the received verbal command matches one or more of the model vehicle instructions;
   generating, on the client device, control signal data based on the received verbal command matching one or more of the model vehicle instructions; and
   transmitting, via a wireless communications interface, the control signal data to the model vehicle.

2. The method of claim 1, further comprising:
   receiving, on the client device, one or more images generated by an image sensor on the model vehicle.

3. The method of claim 2, wherein the server comprises one or more network servers of a network platform; and wherein the method further comprises:
   uploading, b the client device, the received one or more images to the server from which a plurality of one or more images can be accessed by network platform users.

4. The method of claim 3, further comprising:
displaying the one or more images received from the model vehicle on a display device of the client device in real-time or near real-time.

5. The method of claim 2, wherein the model vehicle instructions received from the server are configuration settings for the model vehicle.

6. The method of claim 1, further comprising:
playing an audio clip on the client device informing of events or activities associated with operating the model vehicle.

7. The method of claim 1, wherein the wireless communications interface is an Application Programming interface (API).

8. The method of claim 1, wherein the server comprises a plurality of different model vehicle instruction sets for different model vehicles, and the model vehicle instructions stored on the client device is one of the plurality of different model vehicle instruction sets.

9. The method of claim 1, further comprising:
transmitting, by the client device, the control signal data to an external transmitting device that is connected to the client device by a port.

10. The method of claim 9, wherein the port is at least one of: a Bluetooth port, a Win port.

11. The method of claim 9, wherein the port is an speaker port of the client device.

12. The method of claim 1, wherein the control signal data specifies manipulations of electrical components on the model vehicle.

13. The method of claim 12, wherein the electrical components of the model vehicle include one or more of: one or more steering controls, one or more throttle controls, or one or more image sensor controls.

14. The method as recited in claim 1, further comprising:
displaying, on the client device, a plurality of different model vehicles; and
receiving, on the client device, selection of the model vehicle from the plurality of different model vehicles.

15. A client device comprising:
a memory comprising instructions;
a display device;
a microphone; and
one or more computer processors, wherein the instructions, when executed by the one or more computer processors, cause the one or more computer processors to perform operations comprising:
storing, in the memory, model vehicle instructions received from a server, each of the model vehicle instructions associated with a control command of a model vehicle;
receiving, by the client device, a verbal command detected by the microphone;
determining, by the client device, that the received verbal command matches one or more of the model vehicle instructions;
generating, by the client device, control signal data based on the received verbal command matching one or more of the model vehicle instructions; and
transmitting, via a wireless communications interface, the control signal data to the model vehicle.

16. The client device of claim 15, wherein the server comprises one or more network servers of a network platform; and wherein the operations further comprise:
uploading, by the client device, the received one or more images to the server from which a plurality of one or more images can be accessed b network platform users.

17. The client device of claim 15, wherein the wireless communications interface is an Application Programming Interface (API).

18. The client device of claim 15, the operations further comprising:
transmitting, by the client device, the control signal data to an external transmitting device that is connected to the client device by a port.

19. A non-transitory machine-readable storage medium including instructions that, when executed by a client device, cause the client device to perform operations comprising:
storing, in memory, model vehicle instructions received from a server, each of the model vehicle instructions associated with a control command of a model vehicle;
receiving, by the client device, a verbal command detected by a microphone of the client device;
determining, by the client device, that the received verbal command matches one or more of the model vehicle instructions;
generating, by the client device, control signal data based on the received verbal command matching one or more of the model vehicle instructions; and
transmitting, via a wireless communications interface, the control signal data to the model vehicle.

20. The non-transitory, machine-readable storage medium as recited in claim 19, wherein the server comprises one or more network servers of a network platform; and wherein the operations further comprise:
uploading, by the client device, the received one or more images to the server from which a plurality of one or more images can be accessed b network platform users.

* * * * *

UNITED STATES PATENT AND TRADEMARK OFFICE
CERTIFICATE OF CORRECTION

PATENT NO. : 10,453,333 B1
APPLICATION NO. : 15/948669
DATED : October 22, 2019
INVENTOR(S) : Ari Krupnik Page 1 of 1

It is certified that error appears in the above-identified patent and that said Letters Patent is hereby corrected as shown below:

In the Claims

In Column 16, Line 64, in Claim 3, delete "b" and insert --by-- therefor

In Column 17, Line 12, in Claim 7, delete "interface" and insert --Interface-- therefor In Column 17, Line 24, in Claim 10, delete "Win" and insert --WiFi-- therefor In Column 18, Line 17, in Claim 16, delete "b" and insert --by-- therefor In Column 18, Line 49, in Claim 20, delete "b" and insert --by-- therefor Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*